United States Patent [19]

Carter et al.

[11] Patent Number: 4,742,189

[45] Date of Patent: May 3, 1988

[54] VISCO-ELASTIC DELAYED ACTUATOR

[75] Inventors: Robert E. Carter, Auburndale, Mass.; W. Porter Stone, Walpole, N.H.

[73] Assignee: Piezo Electric Products, Inc., Cambridge, Mass.

[21] Appl. No.: 940,803

[22] Filed: Dec. 12, 1986

[51] Int. Cl.[4] ....................... H01H 7/00; G04C 23/00; A01G 27/00

[52] U.S. Cl. ............................... 200/33 R; 200/61.86; 200/237; 222/638; 239/70

[58] Field of Search ............... 200/33 R, 34, 186, 237, 200/238, 239, 283, 329, DIG. 45, 61.86; 73/150 A; 222/638–652; 267/113, 114; 123/90.59; 239/70, 99, 101

[56] References Cited

U.S. PATENT DOCUMENTS

| | | | |
|---|---|---|---|
| 2,570,854 | 10/1951 | Pierce | 123/90.59 |
| 2,755,349 | 7/1956 | Silvers | 200/33 R |
| 3,471,659 | 10/1969 | Ferrara | 200/33 R |
| 3,907,493 | 9/1975 | Thettu | 219/469 X |

*Primary Examiner*—J. R. Scott

*Attorney, Agent, or Firm*—Joseph S. Iandiorio; Douglas E. Denninger

[57] ABSTRACT

A visco-elastic actuator mechanism including a support section and an actuator section. A visco-elastic adhesive is mounted to one of the sections and is engageable by the other of the sections to hold the actuator in a first state. A spring urges apart one of the sections relative to the other until the actuator is abruptly switched to a second state.

25 Claims, 2 Drawing Sheets

VISCO-ELASTIC DELAYED ACTUATOR

FIELD OF INVENTION

This invention relates to a visco-elastic delayed actuator and more particularly to a mechanism which operates devices such as relays, valves and fluid dispensers by temporarily holding such devices in a first state and then abruptly and automatically switching them to a second state.

BACKGROUND OF INVENTION

Time delayed actuators are widely employed to switch relay contacts, open and close fluid control valves and operate many other types of mechanisms. Electrical and electronic timers are perhaps the most commonly used devices of this type. In certain applications, however, such timers are impractical because of their expense, complexity and/or need for a power supply.

As an alternative to the electrical timer a dashpot type of delayed actuator may be utilized. This mechanism includes a piston disposed within a fluid filled cylinder. As the piston is moved through the cylinder fluid is forced through a circumferential gap between the piston and the cylinder wall so that the piston gradually changes from a first state to a second state.

A rotary plate delayed actuator is used to slow the motion of cassette tape machine doors and record player armatures. This device employs a pair of parallel plates that are separated by a layer of viscous fluid. Torque is applied to one of the plates while the other is held fixed and the viscous change of the fluid slows the motion of the movable plate.

Typically, dashpot and rotary plate devices are effective for providing delays of only a few seconds. In order to extend their delay periods their fluid reservoirs must be made impractically large. Increasing the delay of the dashpot device alternatively requires making the circumferential gap exceedingly and impractically small. Moreover, both devices must be hermetically sealed to prevent escape or contamination of the fluid. And each requires at least one precision tolerance (i.e., the dashpot piston/cylinder clearance and the rotary plate spacing) which adds significantly to the cost of the device.

There is a particular need for an inexpensive and effective time delayed actuator mechanism for dispensing of fragrances, insecticides and other airborne fluids only when needed. Present dispensers are typically either passive or active. Passive devices employ a container filled with a fluid. A wick protruding from the fluid filled container absorbs the fluid and emits it into the air. These systems do not employ extremely volatile fluids because such fluids evaporate too rapidly. However, as a result, the emission rate of these devices is often not sufficient to perform the function desired, e.g., the elimination of offensive odors.

Less volatile fluids may be dispensed more effectively with an active device that employs an electric blower or heater to stimulate emission. However, such devices are fairly expensive and again require a source of electrical power.

SUMMARY OF INVENTION

It is therefore an object of this invention to provide a delayed actuator mechanism which is relatively uncomplicated and simple to manufacture and operate and which does not require a source of electricity, precision parts or a hermetic seal.

It is a further object of this invention to provide a delayed actuator mechanism that remains in a first state for extended periods of time and to then rapidly, reliably and automatically switches to a second state at the end of the timing cycle.

It is a further object of this invention to provide a delayed actuator that is effective for operating a wide variety of fluid dispensers, valves, relays and other mechanisms.

It is a further object of this invention to provide a delayed actuator that enables a fluid dispenser to dispense effective amounts of fluid only as needed.

This invention results from the realization that an improved time delayed actuator mechanism with an extended time delay may be provided by utilizing a visco-elastic adhesive to delay operation of the actuator so that it remains in a first state for a large portion of the timed cycle and then relatively rapidly switches to a second state.

This invention relates to a visco-elastic delayed actuator mechanism including a support section and an actuator section. There are visco-elastic adhesive means mounted to one of the sections and being engageable by the other of the sections to hold the actuator in a first state. Resilient means are provided for urging the sections apart until the actuator is abruptly switched to a second state.

In a preferred embodiment, the support section includes a chamber for containing a fluid and an opening for dispensing the fluid. The actuator section may include a closure section for alternately covering and uncovering the opening to respectively block and permit the dispensing of fluid. The closure section may include a lever portion pivotably mounted to the support section and a closure portion connected to the lever portion for covering and uncovering the opening. The resilient means may be interconnected between the support section and the closure section. Such resilient means may include a compression spring. The adhesive means is typically mounted on the support section.

In an alternative embodiment, the actuator mechanism may include first electrical contact means mounted on the support section, and the actuator section may include a second electrical contact means for making selective electrical contact with the first contact means in one of the first or second states and being spaced from the first contact means in the other of the first and second states. More particularly, the support section may include an adhesive supporting portion and the first contact means may be mounted between the second contact means and the adhesive supporting portion for engaging the second contact means when the actuator section is in the first state. Alternatively, the second contact means may be carried between the first contact means and the adhesive supporting portion for engaging the first contact means when the actuator section is in the second state. The resilient means may include a leaf spring which is integrally connected with the second contact means.

A container may be mounted on the support section for holding the adhesive means. The actuator section may include an insertion member which is selectively insertable in the adhesive means. Guide means may be mounted to the support section for guiding insertion and removal of the insertion member into and out of the adhesive means. The support section may include a lower portion for supporting the adhesive means, an upper support portion and means interconnecting the upper and lower portions. In such an embodiment, the actuator section is preferably suspended by the resilient means from the upper portion.

The resilient means may be integrally attached to the support section and the support section, resilient means and actuator section may comprise a unitary leaf spring.

The resilient means employed by this invention may include a variety of helical or leaf springs.

BRIEF DESCRIPTION OF THE DRAWINGS

Other objects, features and advantages will occur from the following description of a preferred embodiment and the accompanying drawings, in which.

DESCRIPTION OF THE PREFERRED EMBODIMENTS

Figure 1:
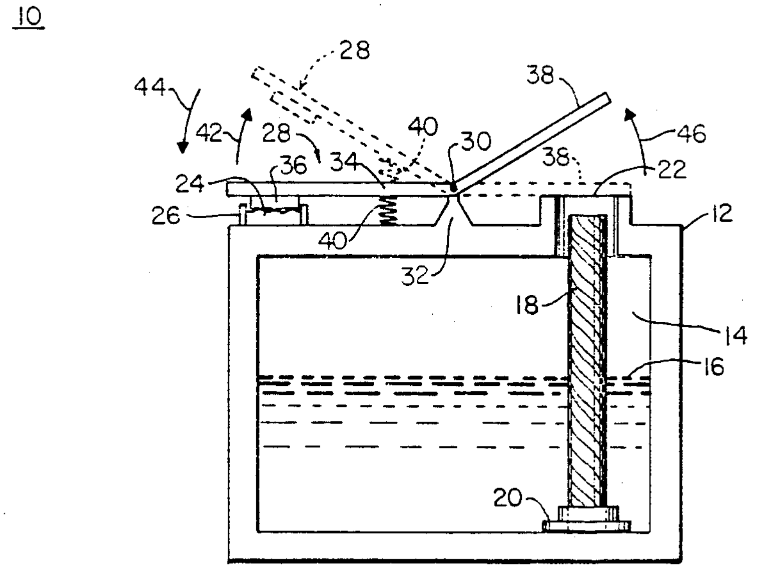
FIG. 1 is an elevational cross-sectional view of a fluid dispenser using the visco-elastic delayed actuator mechanism of this invention.

A visco-elastic delayed actuator mechanism according to this invention may be accomplished by mounting an actuator section to a support section. A visco-elastic adhesive such as the material which composes STICK EM TM brand mouse trap glue manufactured by J. T. Eaton and Company is mounted to one of the sections and is engageable by the other section so that the actuator is held in a first state. Resilient means urge the support and actuator sections apart until the adhesive engagement is abruptly broken to switch the actuator into a second state.

The desired time delay is provided while the actuator and support section are held in the first state by the visco-elastic adhesive. Accordingly, the visco-elastic adhesive typically must exhibit a high surface adhesion or stickiness. In order to provide time delays of hours or more the adhesive must exhibit elasticity even under strains on the order of thousands of a percent. By selecting a visco-elastic adhesive with suitable adhesion, time delays of minutes to hours and even days may be provided. At the same time, the electrical energy and intricate construction required by most conventional timers are eliminated.

The actuator mechanism may be used to control a variety of devices such as fluid dispensing mechanisms, electrical contacts and valves. For example, in a fluid dispenser the support section typically defines a housing which includes a chamber for containing a fluid, such as a fragrance or an insecticide, and an opening for dispensing the fluid. In such an embodiment the actuator section includes a closure section for selectively covering and uncovering the opening to respectively block and permit the dispensing of fluid from the chamber. The closure section may include a lever portion pivotably mounted to the support section and a closure portion connected to the lever portion for selectively covering and uncovering the opening. The resilient means may comprise a compression spring which is interconnected between the support section and the closure section and which urges those sections gradually apart. The visco-elastic adhesive is mounted on the support section. The actuator and support sections are preferably constructed of light-weight plastic, metal or other suitable materials. The support section does not have to be hermetically sealed. Typically, the closure is opened by pivoting the lever portion and compressing the compression spring so that the actuator engages and adheres to the visco-elastic adhesive. The compression spring urges the actuator section gradually apart from the closure section until the adhesive engagement is broken and the opening is closed. The time duration of the gradual separation and hence the dispensing duration is controlled by the viscosity and adhesion of the visco-elastic adhesive selected. By selecting a stickier visco-elastic adhesive a longer dispensing duration is provided and conversely by utilizing a less viscous or less sticky adhesive a shorter dispensing duration is achieved. For example, where an adhesive having a viscosity of 0.4 ounce minutes/(in)$^2$ is utilized on a 2 in$^2$ surface and a 25 gram force is applied, a delay of twenty minutes is achieved. Applying the same force but using an adhesive with a viscosity of 0.04 ounce min/in$^2$ yields a delay of five minutes.

The actuator mechanism of this invention may also be used as a timed relay by providing first electrical contact means mounted to the support section and second electrical contact means carried by the actuator section. The first and second contact means make electrical contact in one of the first and second states and are spaced from each other in the other of the first and second states. The support section may include an adhesive-supporting portion and the first contact means may be located between the second contact means and the adhesive-supporting portion for engaging the second contact means when the actuator section is in the first state. Alternatively, the second contact means may be carried between the first contact means and the adhesive supporting portion for engaging the first contact means when the actuator section is in the second state. Typically, the resilient means is a leaf spring which is both a part of the actuator section and forms the second contact means.

The adhesive may be mounted directly on the support section or alternatively may be disposed on a base or within a container. The actuator section may include an insertion member which is inserted in the adhesive means to hold the actuator section in the first state. A guide may be mounted to the support section for guiding the insertion section into and out of the adhesive. The support section may include a lower support portion for supporting the adhesive means, an upper support portion and a portion interconnecting the upper and lower portions. In such embodiments, the actuator section is typically suspended by the resilient means from the upper portion.

The resilient means may include a helical spring, a leaf spring or any similar means for providing the switching force required. In one embodiment, the support section, resilient means and actuator section are integrally interconnected and form a unitary leaf spring.

There is shown in FIG. 1 a visco-elastic delayed fluid dispenser 10 which includes a support section 12 in the form of a housing with an interior chamber 14. The chamber accommodates a fluid 16 which may be a fragrance, insecticide or other volatile substance to be dispensed. A wick 18 is mounted in holder 20 within chamber 14 and extends into opening 22 of housing 12. Wick 18 absorbs volatile fluid 16 and, with opening 22 uncovered, dispenses the fluid as a vapor through opening 22 and into the surrounding environment.

A visco-elastic adhesive 24 is held in a container 26 which is mounted on the upper surface of housing 12. An actuator 28 is pivotably mounted by pivot 30 to fulcrum 32 of housing 12. The actuator includes a lever portion 34 that carries an engagement member 36 at one end. A closure portion 38 is integrally attached to the opposite end of lever portion 34. A compression spring 40 interconnects housing 12 and actuator 28 and is biased to urge actuator 28 to pivot upwardly in the direction of arrow 42.

In order to dispense fluid for a desired period of time actuator 28 is pivotably lowered, either manually or automatically by means not shown, in the direction of arrow 44 until engagement portion 36 intimately engages visco-elastic adhesive 24. This compresses spring 40 and raises closure portion 38 in the direction of arrow 46 to uncover opening 22. As a result, volatile fluid 16 is emitted as a vapor by wick 18. This emission continues for as long as engagement portion 36 of actuator 28 remains adhered to adhesive 24 and closure 38 remains open.

With actuator 28 in the open state and member 36 engaged with adhesive 24, compressed spring 40 urges the actuator apart from housing 12, e.g., in the direction of arrow 42. Gradually the engagement portion 36 of actuator 28 is pulled apart from adhesive 24. Finally, the spring force of compression spring 40 overcomes the holding force of adhesive 24 and actuator 28 breaks suddenly away from the adhesive. It switches rapidly in the direction of arrow 42 to the state shown in phantom so that closure portion 38 is pivoted downwardly to cover opening 22. As a result, no further fluid is dispensed through the opening.

Figure 2:
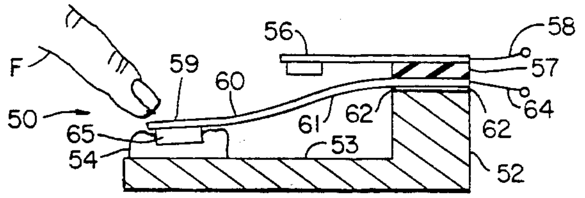
FIG. 2 is an elevational cross-sectional view of a visco-elastic delayed relay in a first state with its contacts separated.
Figure 3:
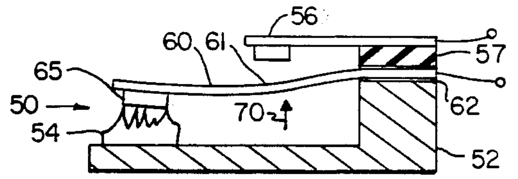
FIG. 3 is a view similar to that of FIG. 2 of the engagement member being gradually urged apart from the adhesive means by the resilient leaf spring.
Figure 4:
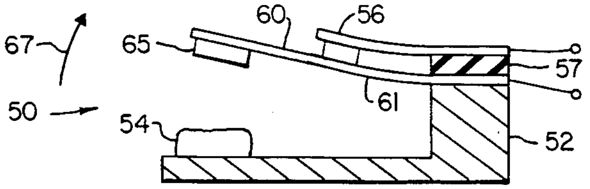
FIG. 4 is a view similar to that of FIGS. 2 and 3 of the relay mechanism in a second state with its contacts engaged.

A visco-elastic delayed relay 50 is shown in FIGS. 2–4. The relay includes a support section 52 which has an adhesive supporting portion 53 for supporting a visco-elastic adhesive 54. A first contact 56 is mounted to the upper surface of raised portion 57 of support section 50 and is connected via an electrode 58 to an electrical circuit not shown. Actuator 52 includes a second electrical contact 60 formed from a metal leaf spring 61 which is received in an opening 62 in support section 52. Contact 60 is similarly connected via an electrode 64 to the electrical circuit.

Leaf spring 61 is biased, as shown in FIG. 4, to urge contact 60 upwardly into engagement with contact 56. In order to temporarily separate contacts 56 and 60 and open the electrical circuit, actuator 59 is urged downwardly apart from contact 56 such as by the operator's finger F, FIG. 2. Leaf spring 61 is bent and engagement portion 65 of actuator 59 is urged into intimate contact with adhesive 54. Then, for as long as engagement portion 65 remains adhered to adhesive 54, contacts 56 and 60 remain separated and the circuit remains open.

As time passes, FIG. 3, spring 61 urges actuator 59 apart from adhesive supporting section 53 of support section 52. In particular, engagement portion 55 is caused to gradually separate from adhesive 54. This separation may require minutes or even hours, depending upon the level of adhesion or stickiness of adhesive 54. However, for as long as at least some adhesion remains, contacts 56 and 60 continue to be separated.

Finally, the force of spring 61 overcomes the adhesive restraint of visco-elastic adhesive 54 and, as shown in FIG. 4, engagement member 65 breaks suddenly away from adhesive 54 in the direction of arrow 67. This causes contact 60 to engage contact 56 and close the electrical circuit.

Figure 5:
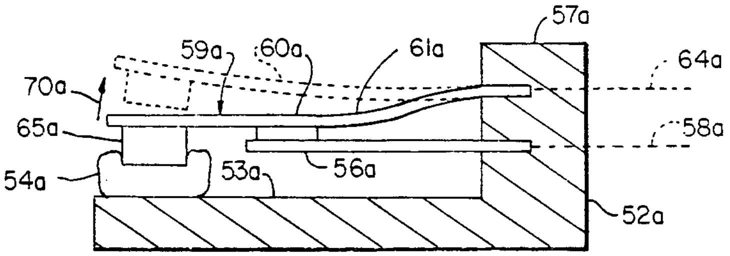
FIG. 5 is an elevational cross-sectional view of an alternative visco-elastic delayed relay.

In an alternative embodiment, FIG. 5, stationary contact **56*a* is mounted on support section 52*a* between adhesive supporting section 53*a* and the actuator 59*a* carrying contact 60*a*. Again, the actuator includes an integral metal leaf spring 61*a* which is attached to raised support portion 57*a*, forms a contact 60*a* and carries an engagement portion 65*a* at its distal end. Spring 61*a* urges actuator 59*a* apart from adhesive 54*a* mounted on support section 52*a***.

By urging actuator **59*a* downwardly so that engagement portion 65*a* intimately engages adhesive 54*a*, contact 60*a* makes electrical contact with contact 56*a*. As a result, the electrical circuit, not shown, which is connected to contact 60*a* and 56*a* by electrodes 64*a* and 58*a* respectively, is closed. The circuit remains closed and operating for the duration of the timing cycle, i.e., for as long as engagement portion remains engaged with adhesive 54*a*. Spring 61 continues to urge actuator 59 upwardly in the direction of arrow 70*a*. For the majority of the timing cycle, e.g., 90% or more, engagement portion 65*a* remains adhered to adhesive 54*a*. Eventually, however, the force of leaf spring 61*a* overcomes the adhesive engagement and actuator 59*a* is snapped suddenly apart from adhesive 54*a* in the direction of arrow 70*a* to the position shown in phantom. This separates contact 60*a* from contact 56*a*** and opens the circuit.

Figure 6:
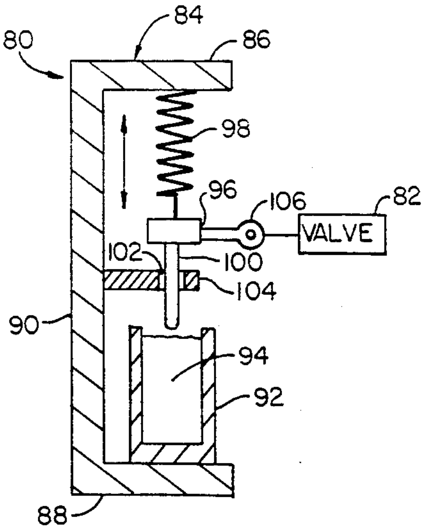
FIG. 6 is a simplified plan view of another alternative visco-elastic actuator mechanism used as a relay.

As shown in FIG. 6, an alternative actuator mechanism 80 according to this invention may be employed to open and close a valve 82. Mechanism 80 includes a support section 84 having an upper portion 86, a lower portion 88 and an intermediate portion 90 which interconnects portions 86 and 88. A container 92 filled with visco-elastic adhesive 94 is mounted on lower support portion 88. An actuator section 96 is suspended from upper support portion 86 by a helical spring 98. Actuator section 96 includes an insertion member 100 which extends through an opening 102 in a guide 104 that is mounted to intermediate section 90 of support 84. An arm 106 extending from actuator 96 operates valve 82 in a conventional manner not shown.

In operation, actuator 96 is lowered so that helical spring 98 is extended and insertion member 100 passes through guide 104 and into adhesive 94. Insertion member 100 temporarily adheres to adhesive 94 so that valve 82 is closed. At the same time, extended spring 98 urges actuator 96 upwardly so that insertion member is gradually pulled out of adhesive 94. Eventually, near the end of the timing cycle the force of spring 98 pulls insertion member 100 completely and suddenly out of adhesive 94. Adhesive engagement is suddenly broken and arm 106 quickly switches valve 82 to an open condition.

Figure 7:
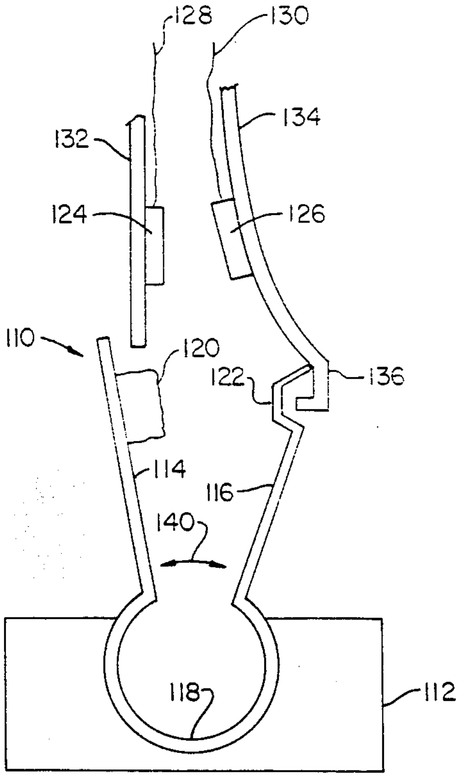
FIG. 7 is an elevational cross-sectional view of a further visco-elastic delayed actuator mechanism for operating a fluid control valve.

A one-piece timed delay actuator 110 is shown in FIG. 7. Actuator 110 is mounted in a base 112 and it comprises a unitary leaf spring including a support section 114, an actuator section 116 and a resilient junction section 118 which joins sections 114 and 116 and urges sections 114 and 116 apart. A visco-elastic adhesive 120 is mounted proximate the distal end of support section 114. The distal end of actuator section 116 forms a hooked portion 122.

Actuator mechanism 110 is used to open and close a pair of electrical contacts 124 and 126 which are connected to an electrical circuit, not shown, through respective electrodes 128 and 130. Contacts 124 and 126 are mounted on respective switch members 132 and 134 which are biased by means not shown to urge the contacts together. Member 134 includes a hooked portion 136 which engages hook portion 122 of actuator 116. With sections 114 and 116 in the separated state, hook portion 122 holds switch member 134 apart from member 132 and thereby separates contacts 124 and 126. As sections 114 and 116 are urged together the holding force of hook portion 122 is removed and separation between switch members 132 and 134 and the contacts 124 and 126 that they carry is reduced until the contacts engage. The bottom of hook portion 122 intimately engages adhesive 120 and actuator 116 is held temporarily in a state engaged with section 116 so that contacts 124 and 126 remain closed. During this timing cycle spring 118 urges sections 114 and 116 apart in the direction of double-headed arrow 140. Gradually, the hooked portion 122 separates from adhesive 120. Finally, the force of spring 118 totally overcomes the adhesive retaining force and hook portion 122 snaps suddenly apart from adhesive 120. As a result, hook portion 122 deflects switch member 134 and again separates contacts 124 and 126.

Although in each of the embodiments described herein the actuator section is mounted to the support section, this is not a limitation of this invention and in alternative embodiments the actuator and support may be mounted entirely independently of one another.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A visco-elastic delayed actuator mechanism, comprising:

a support section;

an actuator section;

visco-elastic adhesive means mounted to one of said sections and being engageable by the other of said sections to temporarily hold said actuator section in a first state; and resilient means for urging said sections apart until the adhesive engagement is abruptly broken to switch said actuator to a second state.

2. The actuator mechanism of claim 1 in which said support section includes a chamber for containing a fluid and an opening for dispensing said fluid.

3. The actuator mechanism of claim 2 in which said actuator section includes a closure section for alternately covering and uncovering said opening to respectively block and permit the dispensing of fluid.

4. The actuator mechanisms of claim 3 in which said closure section includes a lever portion pivotably mounted to said support section and a closure portion connected to said lever portion for covering and uncovering said opening.

5. The actuator mechanism of claim 1 in which said resilient means is interconnected between said support section and said actuator section.

6. The actuator mechanism of claim 5 in which said resilient means includes a compression spring.

7. The actuator mechanism of claim 5 in which said resilient means includes a leaf spring.

8. The actuator mechanism of claim 5 in which said resilient means includes a helical spring.

9. The actuator mechanism of claim 1 in which said adhesive means is mounted on said support section.

10. The actuator mechanism of claim 1 further including first electrical contact means mounted to said support section and in which said actuator section includes second electrical contact means for making selective electrical contact with said first contact means in one of said first and second states and being spaced from said first contact means in the other of said first and second states.

11. The actuator mechanism of claim 10 in which said support section includes an adhesive supporting portion and in which said first contact means is mounted between said second contact means and said adhesive supporting portion for engaging said second contact means when said actuator section is in the first state.

12. The actuator mechanism of claim 10 in which said support section includes an adhesive supporting portion and in which said second contact means is carried between said first contact means and said adhesive supporting portion for engaging said first contact means when said actuator section is in the second state.

13. The actuator mechanism of claim 10 in which said resilient means includes a leaf spring connected to said second contact means.

14. The actuator mechanism of claim 13 in which said leaf spring is integrally connected with said second contact means.

15. The actuator mechanism of claim 1 further including a container mounted on said support section for holding said adhesive means.

16. The actuator mechanism of claim 1 in which said actuator section includes an insertion member which is selectively insertable in said adhesive means.

17. The actuator mechanism of claim 16 further including guide means mounted to said support section for guiding insertion and removal of said insertion member into and out of said adhesive means.

18. The actuator mechanism of claim 1 in which said support section includes a lower support portion for supporting said adhesive means, an upper support portion and means interconnecting said upper and lower portions, said actuator section being suspended by said resilient means from said upper portion.

19. The actuator mechanism of claim 1 in which said resilient means is integrally attached to said support section.

20. The actuator mechanism of claim 1 in which said resilient means is integrally attached to said actuator section.

21. The actuator mechanism of claim 1 in which said support section, resilient means and actuator section comprise a unitary leaf spring.

22. A visco-elastic fluid dispenser comprising:

a support section having a chamber for containing a fluid and an opening for dispensing said fluid;

an actuator section including a closure section for alternately covering and uncovering said opening to respectively block and permit the dispensing of fluid;

visco-elastic adhesive means mounted to one of said sections and being selectively engageable by the other of said sections to temporarily hold said actuator section in a first state with said closure section open; and resilient means for urging said sections apart until the adhesive engagement is abruptly broken to switch said closure means to a closed state.

23. A visco-elastic delayed relay mechanism comprising:

a support section;

an actuator section;

visco elastic adhesive means mounted to one of said sections and being selectively engageable by the other of said sections to temporarily hold said actuator section in a first state;

resilient means for urging said sections apart until the adhesive engagement means is abruptly broken to switch said actuator section to a second state; and first contact means mounted to said support section; said actuator section including second contact means for making selective electrical contact with said first contact means in one of said first and second states and being spaced from said first contact means in the other of said first and second states.

24. A visco-elastic delayed actuator mechanism, comprising:

a support section;

an actuator section;

visco-elastic adhesive means mounted to one of said sections and being selectively engageable by the other said section to temporarily hold said actuator section in a first state; and leaf spring means for urging said sections apart until the adhesive engagement is abruptly broken to switch said actuator section to a second state.

25. A visco-elastic delayed actuator mechanism comprising:

a support section including an upper support portion, a lower support portion and means interconnecting said upper and lower support portions;

an actuator section;

visco-elastic adhesive means mounted to one of said sections and being selectively engageable by the other said section to temporarily hold said actuator section in a first state; and resilient means for suspending said actuator section from said upper support portion and urging said sections apart until the adhesive engagement is abruptly broken to switch said actuator means to a second state.

* * * * *